US007490400B2

(12) United States Patent
Zurkirchen

(10) Patent No.: US 7,490,400 B2
(45) Date of Patent: Feb. 17, 2009

(54) WIRE-PROCESSING DEVICE

(75) Inventor: Heinz Zurkirchen, Alpnach Dorf (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 11/014,417

(22) Filed: Dec. 16, 2004

(65) Prior Publication Data

US 2005/0132770 A1 Jun. 23, 2005

(30) Foreign Application Priority Data

Dec. 22, 2003 (EP) ................................ 03405915

(51) Int. Cl.
*B23B 19/00* (2006.01)

(52) U.S. Cl. ............................ 29/748; 29/749; 29/755; 29/742; 29/33 F; 414/785

(58) Field of Classification Search ........... 29/745–753, 29/755–759, 760, 33 M, 564.4; 83/76.9, 83/9.5, 13, 947, 76.8; 72/428, 131, 307, 72/403; 140/71 R; 81/9.51; 414/275, 496, 414/543, 561, 730, 785, 940
See application file for complete search history.

(56) References Cited

U.S. PATENT DOCUMENTS 4,375,229 A * 3/1983 Mikami et al. .............. 140/102
4,663,822 A * 5/1987 Blaha et al. ................ 29/564.4
4,879,934 A * 11/1989 Adlon et al. ................. 83/76.9
5,210,942 A 5/1993 Emmerich et al.
5,363,681 A * 11/1994 Speck et al. .................. 72/129
5,505,398 A 4/1996 Emmerich
6,230,386 B1 * 5/2001 Hasegawa .................. 29/564.4
6,397,900 B1 * 6/2002 Sautter et al. ............. 140/71 R
6,886,438 B2 * 5/2005 Viviroli et al. ................. 83/13
7,043,825 B2 * 5/2006 Conte .......................... 29/748
2004/0158976 A1 * 8/2004 Conte .......................... 29/742

FOREIGN PATENT DOCUMENTS

EP 0 994 538 4/2000

* cited by examiner

*Primary Examiner*—Minh Trinh
(74) *Attorney, Agent, or Firm*—Fraser Clemens Martin & Miller LLC; William J. Clemens

(57) ABSTRACT

A wire-processing device has a swivel-arm with gripper and open gripper-jaws and is able to thread a wire into a guide-tube arranged on a holder of the gripper and which serves as feeder to feed wire-ends to processing stations. The swivel-arm with the gripper is swiveled with reduced torque from a neutral position toward a wire-guide that functions as a threading aid, a pipe of the gripper actuating the wire-guide from a rest position to a working position. To allow threading of the wire into the guide-tube, the wire-guide bridges a distance between the pipe and the holder. After threading, the swivel-arm swivels back into the neutral position, the gripper-jaws being thereby closed, and the wire-guide is returned to the rest position by a tension spring.

10 Claims, 4 Drawing Sheets

WIRE-PROCESSING DEVICE

BACKGROUND OF THE INVENTION

The present invention relates to a wire-processing device with processing stations for processing a wire, which device has at least one feeder with a guide-tube that feeds the wire to the processing stations, and in which a threading aid is provided for threading the cable into the guide-tube.

Usually, the processing stations of a wire-processing device are arranged in a circle, and a swivel-arm feeds the wire-ends to the processing stations for processing (cutting, insulation-stripping, crimping, sleeving, etc.). The wire-ends must be fed to the processing stations accurately, both in the direction of the length of the wire and in the radial direction. Before cutting and insulation-stripping take place, a gripper of the swivel-arm grips the wire. Therefore, provided that the wire-end is guided accurately in a guide-tube of the gripper, the feeding accuracy depends only on the positioning accuracy of the swivel-arm drive. The internal diameter of the guide-tube must be adapted to the cross-section of the wire in such manner that the wire-end in the guide-tube can only move in the longitudinal axis of the wire. Depending on the cross-section of the wire which is to be processed, a corresponding guide-tube must be used, so that the wire-end cannot execute unexpected movements relative to the guide-tube.

When changing from one wire cross-section to another wire cross-section, the guide-tube of the gripper that was previously used must be removed, and a guide-tube which is adapted to the new cross-section must be mounted, into which the wire must be newly threaded. Particularly in the area of the gripper and at the gripper jaws, the leading wire-end causes problems when being advanced, the wire-end catching against edges and component joints. As remedy, a threading aid is foreseen which bridges the area of the gripper jaws when the gripper is open. The threading aid is arranged stationary separate from the gripper in the longitudinal axis of the wire, i.e. the neutral position, the open gripper passing over the threading aid for the purpose of threading. The halves of the threading aid are closed by means of their own, for example pneumatic, actuators, and the wire is advanced through the trumpet-shaped threading aid into the guide-tube. Subsequently, the halves of the threading aid are actively opened by means of the actuators, and the gripper jaws are closed.

A disadvantage of this known device is that the threading aid is arranged in the swiveling, or working, area for wire feeding, and is also actively controlled. In the event of incorrect functioning of the control of the gripper and/or of the threading aid, collisions between the gripper and the threading aid are unavoidable.

SUMMARY OF THE INVENTION

The present invention provides a remedy avoiding the disadvantages of the known device, and creating a wire-processing device that assures accident-free operation. The advantages achieved by the present invention are that the threading aid, or wire-guide, is arranged outside the working area, or swiveling area, of the swivel-arm for wire feeding. When the swiveling motion for wire feeding is being executed, or the processing stations are being served, the threading aid does not obstruct the path of the swivel arm. Collisions are therefore ruled out. Also advantageous is that the threading aid is passive, i.e. has no control, and can therefore be manufactured inexpensively. The swivel-arm approaches the threading aid with its jaws open, and closes at least one half of the threading aid, which then forms a correctly positioned guide-tube in the area of the gripper jaws. After threading, the swivel arm swivels back into the neutral position, the threading aid reaching the starting position through spring-loading.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
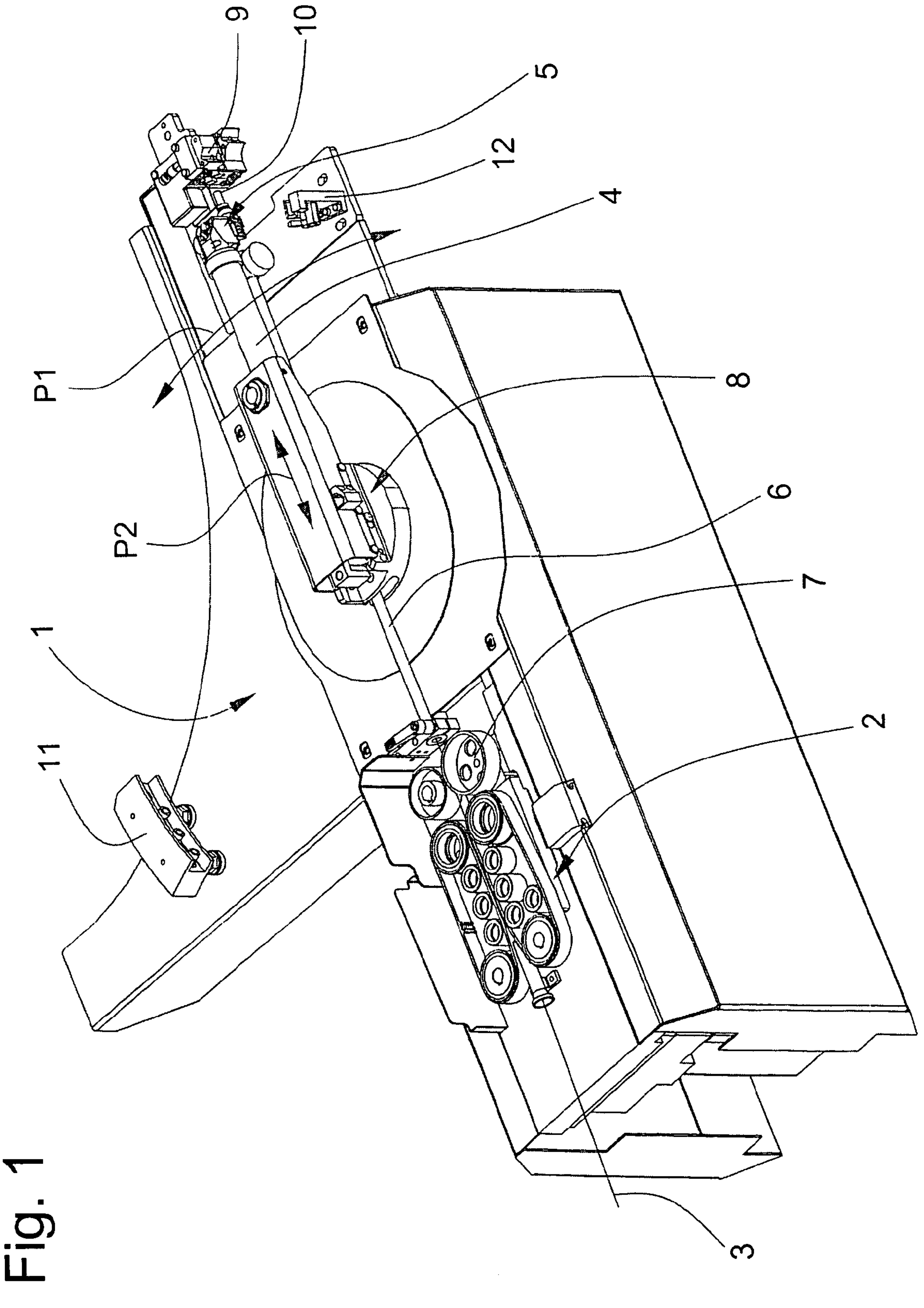
FIG. 1 is a schematic perspective view of a wire-processing device according to the present invention.

FIG. 1 shows a wire-processing device 1 with a wire-advancer executed as a belt-drive 2, the belt-drive 2 feeding a wire 3 to a swivel-arm 4 with a gripper 5. The wire 3 is guided in a flexible tube 6, the advanced length of wire being measurable by means of an encoder 7 of the belt-drive 2. By means of drives 8, the swivel-arm 4 can be set into a swiveling motion symbolized by an arrow P1, and/or into a linear motion symbolized by an arrow P2. Details of the drives 8 and the swivel-arm 4 with the gripper 5 are explained in patent application EP 03405094.8, corresponding to U.S. Pat. No. 7,043,825 incorporated herein by reference.

The swivel-arm 4 is shown in a neutral position, i.e. on a longitudinal axis of the wire 3, in which, for example, a processing station with a cutting head 9 is arranged which cuts off the leading end, and strips the insulation, of a wire-end 3.1 (see FIG. 2), the wire-end 3.1 being held by means of the gripper 5 and a guide-tube 10 arranged on the gripper 5. The internal diameter of the guide-tube 10 fits onto the external diameter of the wire 3. Further guide-tubes 10 with different internal diameters are stored in a magazine 11, the magazine 11 being arranged along the path of the swivel-arm outside the working area and outside the feeding area. Also provided along the path of the swivel-arm as a threading aid outside the working area and outside the feeding area is a stationary wire-guide 12 which can be approached by the swivel-arm 4 and serves to thread the wire 3 into the guide-tube 10 of the gripper 5.

Figure 2:
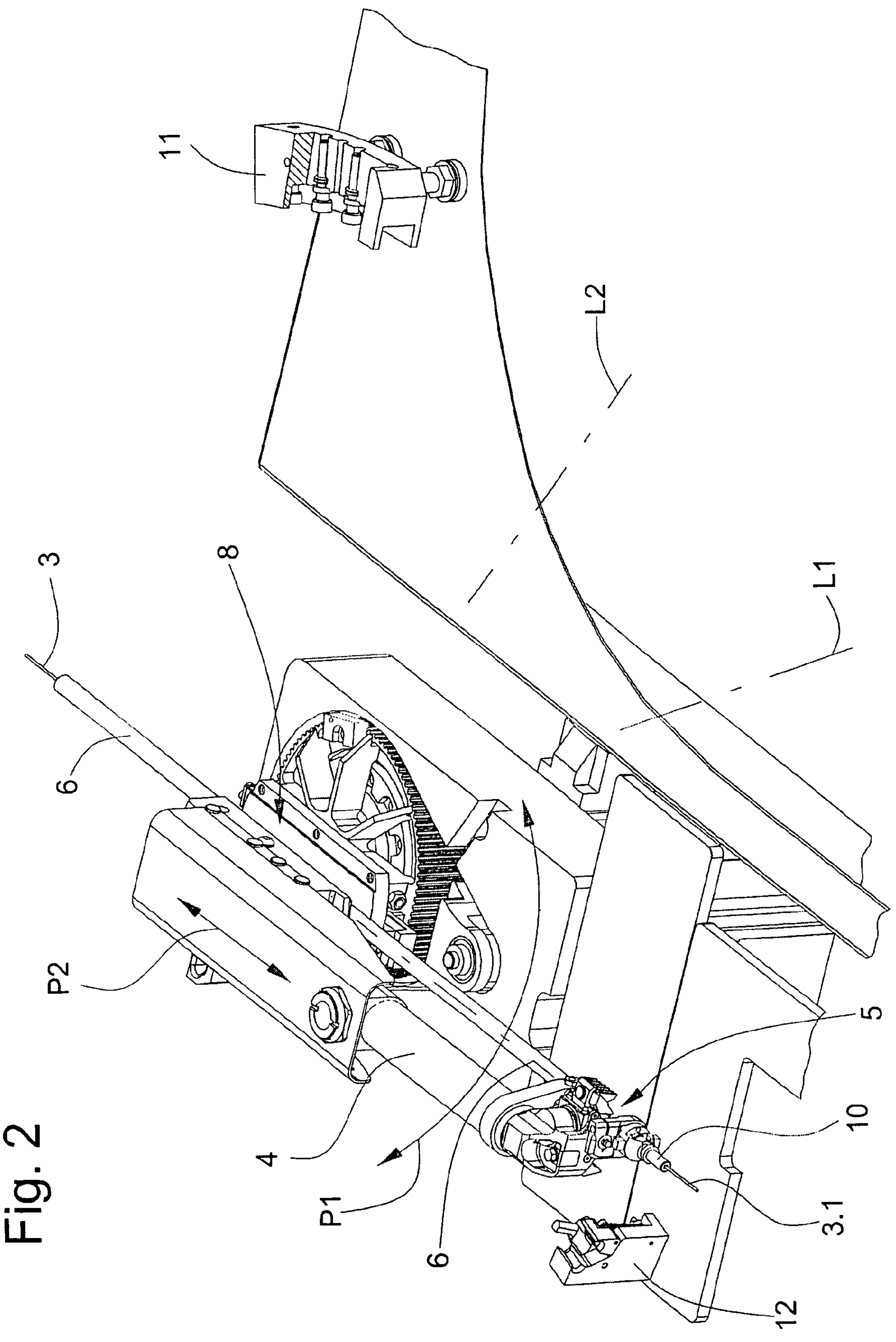
FIG. 2 is a schematic perspective view a feeder with a swivel-arm, a gripper, and a guide-tube of the wire-processing device shown in FIG. 1.

FIG. 2 shows the swivel-arm 4 with the gripper 5 and the guide-tube 10. The swivel-arm 4 with the gripper 5 and the guide-tube 10 serves as a feeder for feeding the wire-ends 3.1 to the processing stations. L1 designates a position of the swivel-arm 4 in which the wire-end 3.1, from which the leading end has been cut off and the insulation stripped, is fed to, for example, a sleeving station, the sleeving station mounting a sleeve on the wire-end 3.1. L2 designates a position of the swivel-arm 4 in which the wire-end 3.1 with the sleeve is fed to, for example, a crimping station, the crimping station fastening a crimped contact onto the wire-end 3.1. The magazine 11, which is arranged along the path of the swivel-arm outside the working area and outside the feeding area, is shown cut open with the further guide-tubes 10. Several magazines 11 with the guide-tubes 10 can also be provided along the path of the swivel-arm 4.

Figure 3:
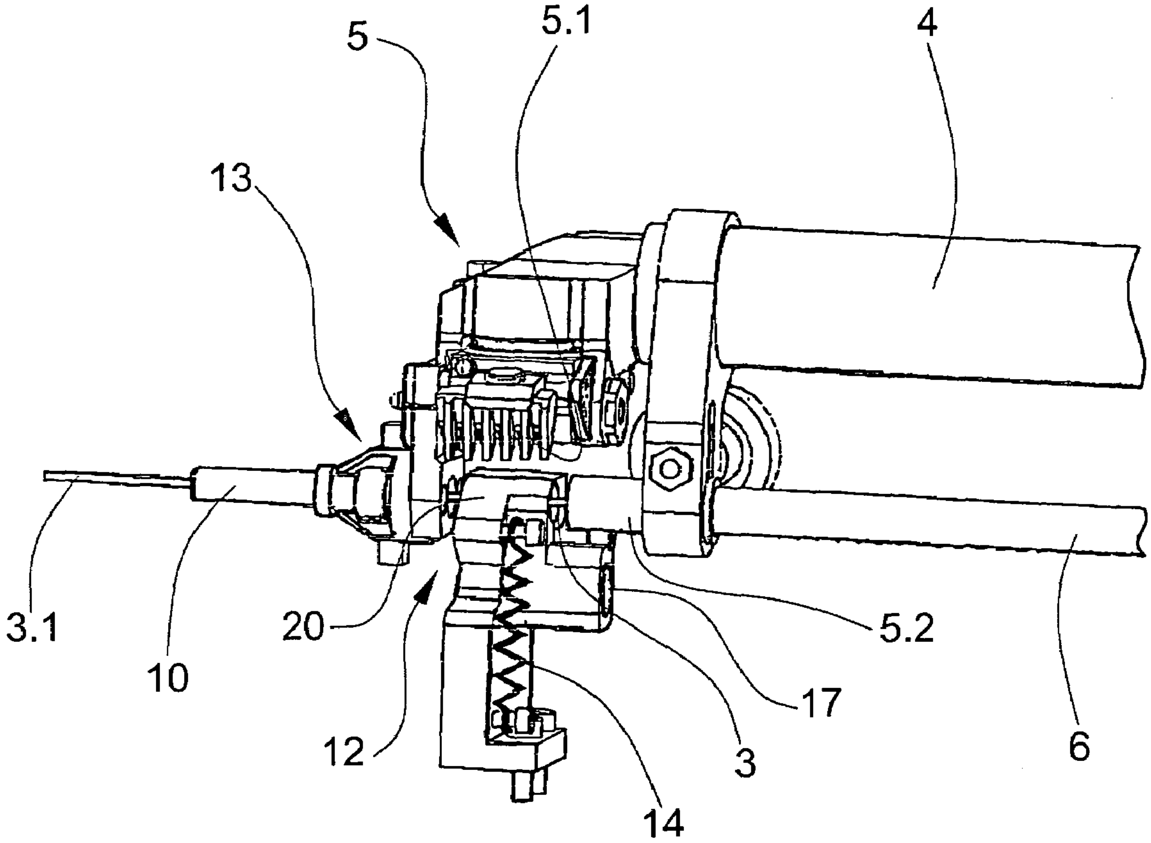
FIG. 3 is a schematic perspective view of the swivel-aim threading a wire.

FIG. 3 shows the swivel-arm 4 with the gripper 5 and open gripper jaws 5.1 in a position for threading the wire 3 into the guide-tube 10 which is arranged on a holder 13 of the gripper 5 and serves as a feeder for feeding wire-ends 3.1 to processing stations. The holder 13 is provided for toolless changing of the guide-tubes 10. The swivel-arm 4 with the gripper 5 has been swiveled with reduced torque from the neutral position toward the wire-guide 12 which is provided as a threading aid, upon which a pipe 5.2 of the gripper 5 has actuated the wire-guide 12. To allow threading of the wire 3 into the guide-tube 10, the wire-guide 12 bridges a distance between the pipe 5.2 and the holder 13. After threading, the swivel-arm 4 swivels back into the neutral position, upon which the gripper-jaws 5.1 are closed and the wire-guide 12 automatically arrives at the resting position under the effect of a tension spring 14. Subsequently, a first processing step, for example cutting off the leading end of the wire 3 by means of the cutting head 9, is executed.

Figure 4:
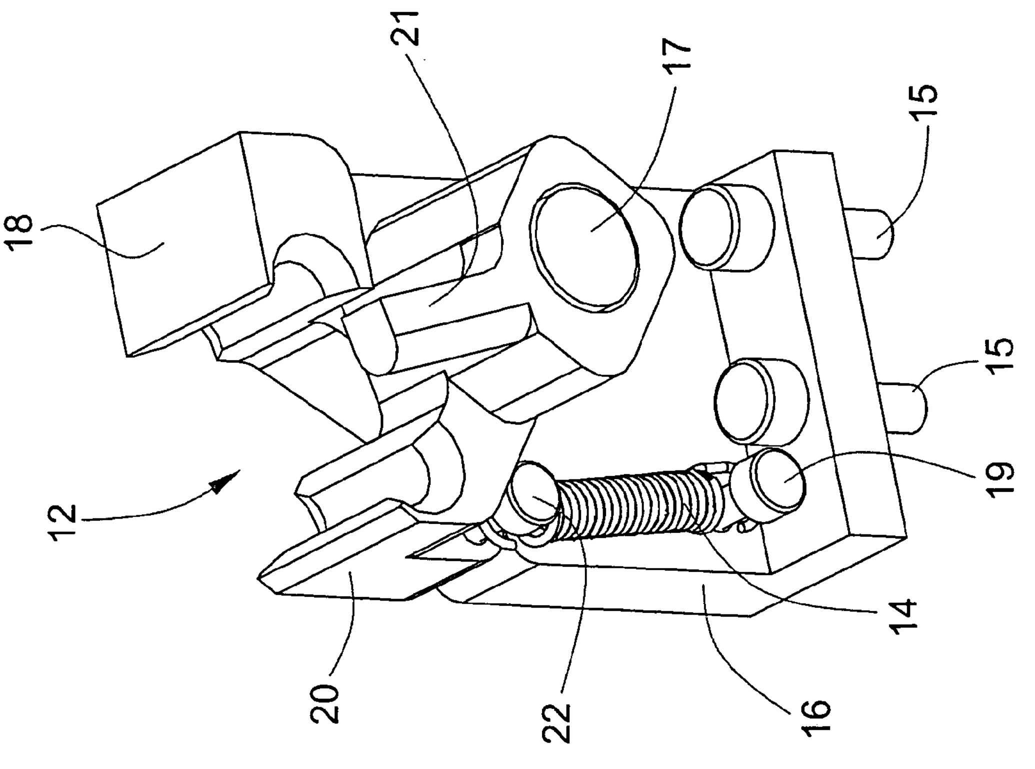
FIG. 4 is an enlarged schematic perspective view of the wire-guide in the rest position.

FIG. 4 shows details of the wire-guide 12 in the rest position. A housing 16, which is firmly fastened by means of screws 15 to a table (see FIG. 1) of the wire-processing machine 1, serves as a support for an axle 17 and for a first threading-aid half 18. Further, arranged on the housing 16 is a first pin 19 onto which is fastened one end of the tension spring 14. A second threading-aid half 20 is arranged rotatably on the axle 17, an arm 21 being provided as actuating member. Arranged on the second threading-aid half 20 is a second pin 22 onto which is fastened the other end of the tension spring 14.

Figure 5:
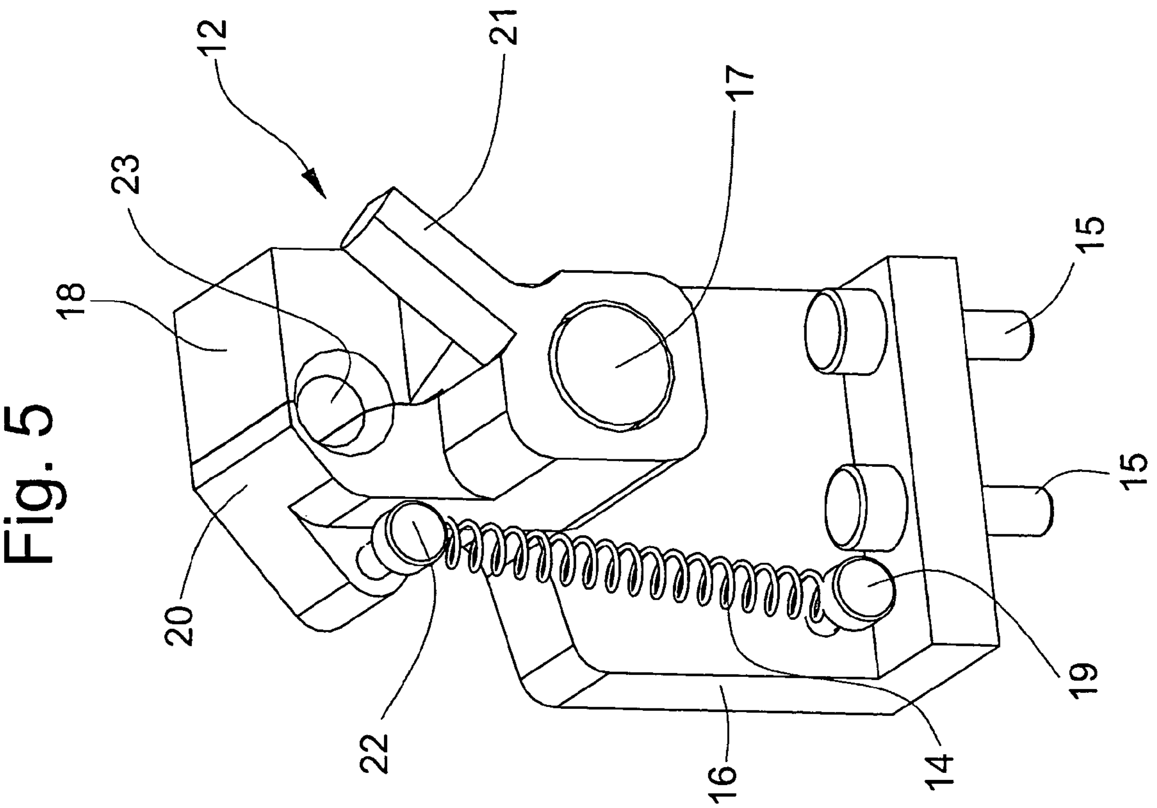
FIG. 5 shows the wire-guide of FIG. 4 in the working position for threading a wire.

When the swivel-arm 4 swivels, the pipe 5.2 strikes the arm 21 and turns the arm 21 together with the second threading-aid half 20 about the axle 17 into the position shown in FIG. 5. The two threading-aid halves 18, 20 thereby form a trumpet-shaped opening 23, or threading-aid, which, when threading, guides the wire 3 from the pipe 5.2 to the holder 13. When the swivel-arm 4 swivels back, the tension spring 14 returns the second threading-aid half 20 to the rest position.

As variant embodiment, a wire-guide 12 can also be provided in which both threading-aid halves 18, 20 can be actuated by means of the swivel-arm 4.

The device according to the present invention can also be provided on wire-processing devices with several swivel-arms, there being provided for each swivel-arm at least one magazine with a stock of the guide-tubes and the wire-guide.

The device according to the present invention can also be used, for example, on wire-processing devices with linear wire-feeding. On such devices, the magazine with the guide-tubes, and the wire-guide, are arranged at one end and the other end outside the working area of the device which feeds the wire-ends, the feeder being able to execute the change of guide-tubes automatically as explained above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire-processing device with processing stations for processing a wire comprises:

a movable feeder positioned in a feeding area with a guide-tube to feed the wire to the processing stations positioned in a working area adjacent to the feeding area, said feeder being movable relative to the processing stations; and a stationary wire-guide for use as a threading-aid for treading the wire into said guide-tube, said wire-guide being spaced from a path of the wire between the feeding area of said feeder and the working area of the processing stations and said feeder moving said guide-tube between the path at the working area and said wire-guide.

2. The wire-processing device according to claim 1 wherein said feeder actuates said wire-guide from a rest position to a working position.

3. The wire-processing device according to claim 2 wherein said wire-guide includes a first threading-aid half and a second threading-aid half which upon actuation by said feeder form a correctly positioned threading-aid in a gripper-jaw area of said feeder.

4. The wire-processing device according to claim 3 wherein said second threading-aid half is arranged rotatably on an axle and has an arm actuated by said feeder for movement from the rest position to the working position against a spring-force.

5. The wire-processing device according to claim 4 wherein said second threading-aid half is returned from the working position to the rest position by the spring-force.

6. The wire-processing device according to claim 3 including a tension spring connected to said second threading-aid half for generating the spring-force.

7. A wire-processing device with processing stations for processing a wire comprises:

a feeder with a guide-tube to feed the wire to the processing stations; and a wire-guide for use as a threading-aid for threading the wire into said guide-tube, said wire-guide being positioned outside a feeding area of said feeder, said feeder actuating said wire-guide from a rest position to a working position, said wire-guide including a first threading-aid half and a second threading-aid half which upon actuation by said feeder form a correctly positioned threading-aid in a gripper-jaw area of said feeder, and said second threading-aid half being arranged rotatably on an axle and having an arm actuated by said feeder for movement from the rest position to the working position against a spring-force.

8. The wire-processing device according to claim 7 wherein said second threading-aid half is returned from the working position to the rest position by the spring-force.

9. The wire-processing device according to claim 7 including a tension spring connected to said second threading-aid half for generating the spring-force.

10. A wire-processing device with processing stations for processing a wire comprises:

a movable feeder positioned in a feeding area with a guide-tube to feed the wire to the processing stations positioned in a working area adjacent to the feeding area, said feeder being movable relative to the processing stations; and a stationary wire-guide for use as a threading-aid for threading the wire into said guide-tube, said wire-guide being spaced from a path of the wire between the feeding area of said feeder and the working area of the processing stations and said feeder swiveling to move said guide-tube from the path to said wire-guide and back to the path.

* * * * *